(12) United States Patent
FitzGerald et al.

(10) Patent No.: US 7,110,966 B1
(45) Date of Patent: Sep. 19, 2006

(54) METHOD FOR ON-LINE SELECTION OF AN AIR CONDITIONING PRODUCT

(75) Inventors: Christopher J. FitzGerald, Farmington, CT (US); Mary C. Burgess, Cleveland, NY (US); Charles E. Bullock, North Syracuse, NY (US); Glenn D. Goodnough, Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 670 days.

(21) Appl. No.: 09/494,156

(22) Filed: Jan. 28, 2000

(51) Int. Cl.
*G08Q 30/00* (2006.01)
(52) U.S. Cl. .................................... 705/26
(58) Field of Classification Search ............ 705/26, 705/27
See application file for complete search history.

(56) References Cited

U.S. PATENT DOCUMENTS

| | | | | |
|---|---|---|---|---|
| 5,729,698 | A * | 3/1998 | Stelter | 705/26 |
| 5,768,142 | A * | 6/1998 | Jacobs | 700/231 |
| 6,035,283 | A * | 3/2000 | Rofrano | 705/27 |
| 6,070,149 | A * | 5/2000 | Tavor et al. | 705/26 |
| 6,282,518 | B1 * | 8/2001 | Farrell et al. | 705/26 |

FOREIGN PATENT DOCUMENTS

JP 60195630 A * 10/1985

OTHER PUBLICATIONS

"Air Conditioners Are More Than Cool Air," PR Newswire (Jul. 23, 1998).*
Steel, J. "Don't' Get Hot and Bothered Aboput Buying AC Go to an Air-Conditioning Showroom Armed with Specific Information That Will Affect Your Cooling Needs," Chicago Tribune (Jul. 15, 1996).*
Sheinkopf (Air-conditioner alphabet soup, Dallas Morning News (Jun. 30, 1995).*
Lonngren, B. "Get Cookin' It's Time to Put 'Cool' on the Front Burner," Chicago Tribune (May 26, 1995).*
Ciccolella, Cathy: Carrier trying out online AC sales, TWICE, New York, Sep. 6, 1999, v14,i20, p. 6.*
"Comfort At Home: Room Air Conditioning" [online]<retrieved via www.archive.org>[archived May 4, 1998][printed May 12, 2006][1 page].*

* cited by examiner

*Primary Examiner*—Jeffrey A. Smith
(74) *Attorney, Agent, or Firm*—Bachman & LaPointe, P.C.

(57) ABSTRACT

An interactive method for on-line selection of an air conditioning product includes the steps of providing a database storing a plurality of air conditioning product identifiers and at least one corresponding product characteristic; interactively obtaining intended use information from a consumer for a desired air conditioning product; equating the intended use information with an intended use product characteristic; identifying a suitable product having the at least one product characteristic meeting the intended use product characteristic; and identifying the suitable product to the consumer.

12 Claims, No Drawings

METHOD FOR ON-LINE SELECTION OF AN AIR CONDITIONING PRODUCT

TECHNICAL FIELD

The invention relates to a system and method or on-line selection of a product and, more particularly, to an interactive system and method for on-line selection and purchase of an air conditioning product.

BACKGROUND OF THE INVENTION

A portion of the disclosure of this document contains material which is subject to copyright protection. The copyright owner has no objection to the reproduction by anyone of the patent document or the patent disclosure as it appears in the Patent Office file, but otherwise reserves all copyright rights whatsoever.

Air conditioning products are widely used for conditioning the environment in enclosed areas. For example, room air conditioning products are used for cooling, and in some cases for heating, various enclosed areas such as rooms in a home and the like. Selection of a proper room air conditioning product for a particular intended use should take into account a number of factors related to the intended use location or environment. Unfortunately, consumers frequently select an air conditioning product without considering such factors.

One important characteristic of different air conditioning products is cooling and/or heating capacity. This capacity is typically measured in British Thermal Units or BTUs. A BTU is the amount or quantity of heat required to raise the temperature of 1 lb. of water by 1° F. As it applies to an air conditioning product, this product can be described as having a capacity in terms of BTUs output per hour.

An air conditioning unit should be selected to have a BTU capacity appropriate for the environment in which it will be used. An air conditioning unit having a BTU capacity lower than is required for cooling a particular space and environment would run continuously and would not adequately cool the room. Conversely, an air conditioning product that has a BTU capacity higher than is required will cycle on and off frequently and will not properly dehumidify the environment of use.

A wide variety of different factors to consider when selecting a product having the appropriate capacity are known to the skilled technician in the air conditioning industry. However, such a technician may not routinely be available to a consumer selecting an air conditioning product. Thus, the need exists for an improved system and method by which consumers can select an appropriate air conditioning product for their intended use.

It is therefore the primary object of the present invention to provide such a system and method.

It is a further object of the present invention to provide a system and method for assisting a consumer in selecting an air conditioning product which is interactive and available on-line or by Internet.

Other objects and advantages of the present invention will appear hereinbelow.

SUMMARY OF THE INVENTION

In accordance with the present invention, the foregoing objects and advantages have been readily attained.

In accordance with the present invention, an interactive method for on-line selection of an air conditioning product is provided, comprising the steps of providing a database storing a plurality of air conditioning product identifiers and at least one corresponding product characteristic; interactively obtaining intended use information from a consumer for a desired air conditioning product and intended use location; equating said intended use information with an intended use product characteristic; identifying a suitable product having said at least one product characteristic meeting said intended use product characteristic; and identifying said suitable product to said consumer. Preferably, the characteristic is BTU capacity.

In further accordance with the present invention, one or more types of further intended use location information may be interactively obtained from a consumer and used to determine a correction factor or factors and a corrected acceptable BTU capacity for a desired air conditioning product.

DETAILED DESCRIPTION

The invention relates to a system and method for interactively selecting an air conditioning product. More particularly, the invention relates to a system and method for selecting such an air conditioning product on-line or via the Internet or World Wide Web.

As is well known to a person of ordinary skill in the art, many on-line applications, Internet web pages and/or sites provide consumer accessible content such as product data and the like. Typically, the consumer is acting through a "client" computer system which accesses a "server" computer or computer system or network, whereby information is passed back and forth for a desired purpose. The specific technology for creating and operating such a system is well known to a person of ordinary skill in the art.

In accordance with the present invention, a server is established and programmed to interact with a consumer so as to assist in the proper selection and purchase of an air conditioning product which is appropriate for the consumer's intended use location. The thrust of the system and method is to guide a consumer through selection of an air conditioning product having an acceptable BTU capacity for the intended use location.

Air conditioning products include a wide variety of products such as room air conditioners, humidifiers, dehumidifiers, purifiers and the like. Each of these types of air conditioning products should be selected taking into account a number of factors related to the intended use environment. The following description will be given as the invention relates to proper selection of a room air conditioner and the factors related thereto. It should of course be appreciated that the invention applies equally to other air conditioning products as well such as identified above, each of which has potentially the same or different intended use factors to consider.

As will be discussed more thoroughly below, the consumer selecting an air conditioning product is asked to input certain intended use information which is then utilized to determine an initial BTU capacity and one or more correction factors to be applied to the initial acceptable BTU capacity so as to determine a corrected acceptable BTU capacity for the consumer's desired location. A specific product which possesses a BTU rating meeting the corrected acceptable BTU capacity is then identified and offered for sale to the consumer. In accordance with the invention, the consumer may then proceed to purchase such product. An example of a suitable algorithm for carrying out the method of the invention is attached as Appendix A.

This method is preferably carried out via the Internet with the consumer receiving and providing information through a client computer to a server computer or network of computers programmed with the relevant air conditioning product information and selection algorithm. Alternatively, the software may be provided to consumers for installation on a consumer accessible personal computer, with the program interacting with the consumer to guide proper selection. This mode of operation is specifically included within the term "on-line" as used herein.

In accordance with the method of the present invention, the proposed capacity of an air conditioning product for a specific desired location is determined in terms of capacity per hour, and will be referred to herein in specific units of British Thermal Units or BTU's per hour. It is of course to be understood that different systems of measurement are available for measuring capacity of an air conditioning product, and such capacity measuring systems are considered to be equivalent to and/or interchangeable with the BTUs discussed herein.

The method of the present invention is typically carried out by a computer or network of computers which functions as a consumer-accessible server. The server preferably includes a database storing a plurality of air conditioning product identifiers and at least one corresponding product characteristic. The server is also preferably programmed with a selection algorithm as discussed below which advantageously interacts with a consumer so as to obtain intended use information for a desired air conditioning product and intended use location and to equate this information with a suitable product which is then offered to the consumer. Alternatively, this information and algorithm may be stored on a CD-ROM or other distributable storage mechanisms as discussed above.

The information to be stored at the server preferably includes a first table or relationship equating a square footage or area of space to be cooled with a corresponding initial acceptable BTU per hour. A typical relationship between area and cooling BTU capacity is set forth below in Table 1.

TABLE 1

| Sq. Ft. | BTU |
|---|---|
| 100 | 5000 |
| 150 | 5000 |
| 151 | 6000 |
| 300 | 6000 |
| 301 | 8000 |
| 350 | 8000 |
| 351 | 8600 |
| 450 | 8600 |
| 451 | 10000 |
| 500 | 10000 |
| 501 | 12000 |
| 700 | 12000 |
| 701 | 14000 |
| 800 | 14000 |
| 801 | 15000 |
| 900 | 15000 |
| 901 | 18000 |
| 1300 | 18000 |
| 1301 | 21000 |
| 1450 | 21000 |
| 1451 | 24000 |
| 1700 | 24000 |

The server database is also preferably programmed to store one or more tables each containing a series of product identifiers and corresponding BTU ratings. The relationship between capacity and specific product identifier may suitably be broken into several portions for example related to products having different additional features such as heating capability, window or wall mounting capabilities and the like. For example, these relationships may be divided into a first portion relating to air conditioning products that are window mount capable and can cool only, a second portion of air conditioning products which are wall mount capable and can cool only, and a third portion relating to air conditioning products which can both cool and provide supplemental heat. Typical examples of such tables or portions of the relationship discussed are set forth below in Tables 2, 3 and 4.

TABLE 2

| BTU | Product Identifier |
|---|---|
| 3000 to 5200 | UCA051B |
|  | TCA051B |
|  | TCB051B |
| 5201 to 7000 | LCA061P |
|  | UCB061B |
|  | TCA061D |
|  | PCA061D |
| 7001 to 9000 | UCD081B |
|  | TCA081D |
|  | TCA081P |
|  | 53SSB009-1 |
| 9001 to 11000 | TCA101D |
|  | GCA101B |
| 11001 to 13000 | TCA121D |
|  | GCA121B |
|  | GCA123B |
|  | XCB121E |
|  | XCB121R |
|  | 462AJC012BA |
|  | DCA131G |
| 13001 to 14000 | DCA141D |
| 14001 to 16500 | DCA153D |
|  | 462AJC015BA |
| 16501 to 19000 | XCB183D |
|  | XCB183E |
|  | 462AJC015BA |
| 19001 to 22000 | DCA213D |
|  | YCA213R |
|  | YCB213E |
|  | 462AJC021BA |
| 22001 to 25000 | JCA243D |

TABLE 3

| BTU | Product Identifier |
|---|---|
| 3000 to 5200 | UCA051B |
| 5201 to 7000 | UCB061B |
| 7001 to 9000 | UCD081B |
| 9001 to 11000 | GCA101B |
| 11001 to 13000 | GCA121B |
|  | GCA123B |
|  | XCB121E |
|  | XCB121R |
|  | 462JC012BA |
|  | DCA 131G |
| 13001 to 14000 | DCA141D |
| 14001 to 16500 | DCA153D |
|  | 462AJC015BA |
| 16501 to 19000 | XCB183D |
|  | XCB183E |
|  | 462AJC018BA |
| 19001 to 22000 | DCA213D |
|  | YCA213R |
|  | 462AJCO21BA |
|  | YCB213E |
| 22001 to 25000 | JCA243D |

TABLE 4

| BTU | Product Identifier |
|---|---|
| 3000 to 5200 | N/A |
| 5201 to 7000 | N/A |
| 7001 to 9000 | N/A |
| 9001 to 11000 | XHC101D |
| | XQB101D |
| 11001 to 13000 | XHA123D |
| | XQA123D |
| 13001 to 14000 | XHA123D |
| | XQA123D |
| 14001 to 16500 | XHB153D |
| | XQB153D |
| 16501 to 19000 | XHB183D |
| | XQB183D |
| 19001 to 22000 | YHB243D |
| 22001 to 25000 | YHB243D |

The server database is further preferably programmed to store the selection algorithm and/or several correction factors for use by the algorithm which are used along with information obtained from the consumer and the initial capacity from Table 1 to obtain a corrected acceptable product capacity. This corrected capacity is then used with tables such as Tables 2–4 to identify a suitable product. The selection algorithm and various correction factors will be discussed in detail below. In addition, Appendix A annexed hereto contains a non-limiting example of a specific embodiment of a selection algorithm according to the invention.

Once a consumer has accessed the server for carrying out the method of the present invention, the consumer is asked to enter the dimensions of the intended use location or room. This area is calculated at the server from room dimensions entered by the consumer. Alternatively, the area may be directly entered by the consumer. Areas are referred to herein in units of square feet. Of course, other systems of measurement can be used.

In accordance with the invention, the area is then checked against an area to capacity table such as Table 1 to insure that the information stored in the database can help to select the proper air conditioning product. If the area entered by the consumer exceeds the maximum area in the stored area to initial capacity relationship or table, the consumer can preferably be instructed to contact a local dealer for further assistance with unit selection.

Assuming that the consumer input area is located in the area to initial capacity table, the initial capacity value from the table is assigned by the server to an intermediate identifier of the algorithm such as "BTU 1".

The consumer is then asked to input the area of glass at the intended use location or room which faces the exterior or outdoors. This information to be input should include the area of windows, skylights, glass doors and the like, each of which can add to the required capacity for an air conditioning product suitable for that particular intended use location. The server is preferably programmed to store a correction factor or relationship to correct for the consumer identified exterior facing glass.

For example, the exterior glass area may be used to determine a corrected capacity as follows:

$R_C = R_I + (C \cdot 60)$, wherein $R_I$ is an initial acceptable product capacity in BTU/hour, $R_C$ is a corrected acceptable capacity in BTU/hour, and C is exterior glass area in square feet.

It should be noted that the initial capacity $R_I$ referred to above may be capacity determined from the area to initial capacity table (BTU 1), or may be an intermediate corrected capacity already corrected for other factors such as those discussed below. Further, the corrected capacity $R_C$ may suitably be utilized to select an appropriate product, or may be used as a starting point for other correction determinations. For example, the value of $R_C$ from this step may be assigned to a further intermediate algorithm identifier such as "BTU 2" which is then utilized in subsequent steps to obtain a further corrected rating or capacity. Thus, the term 'initial' as used herein in connection with product capacities and BTU capacities specifically includes, without limitation, intermediate capacities obtained from other correction determinations.

According to the invention, the consumer is next asked to indicate whether the intended use location or room is normally in the sum or shade. Depending upon the answer entered, the server is preferably programmed to carry out a further correction. For example, a corrected capacity may be determined as follows:

If "sun" then $R_C = R_I \cdot 1.1$, and

If "shade" then $R_C = R_I \cdot 0.95$, wherein $R_I$ is an initial or intermediate acceptable capacity in BTU/hour, and $R_C$ is a corrected product capacity in BTU/hour.

The value $R_C$ obtained from this calculation may suitably be used to select a product or may be assigned to a value "BTU 3" for further use in the selection algorithm. Further, the value $R_I$ may be the value "BTU 2" which is obtained following the consumer input of exterior glass area.

The consumer is then preferably asked to enter whether the space above the room is a roof only, an attic or an occupied room. With this information, a further corrected acceptable product capacity is determined, for example as follows:

If roof only, then $R_C = R_I$,

If attic, then $R_C = R_I \cdot 0.85$, and

If occupied room, $R_C = R_I \cdot 0.8$, wherein $R_I$ in an initial or intermediate acceptable capacity in BTU/hour, and $R_C$ is a corrected product capacity in BTU/hour.

The corrected BTU capacity may then be used to select a product or may be assigned to a new algorithm identifier "BTU 4" for use in subsequent steps.

The consumer is then preferably asked to input whether the intended use location is above a cooled space such as a basement or another air-conditioned room, and a further corrected product rating is determined, for example as follows:

If above cooled space, then $R_C = R_I \cdot 0.8$, and

If not above cooled space, then $R_C = R_I \cdot 0.9$, wherein $R_I$ is an initial or intermediate acceptable product capacity in BTU/hour, and $R_C$ is a corrected acceptable product capacity in BTU/hour.

The corrected product capacity determined from this step may be used to select a product or can be assigned to an identifier "BTU 5" for further use by the selection algorithm.

The consumer is then asked to enter whether the desired product will be operated only at night which can affect the appropriate product capacity significantly. The method of the present invention then determines a further corrected acceptable capacity using this information, for example as follows:

If night only, then $R_C = R_I \cdot 0.65$, and

Otherwise, $R_C = R_I$, wherein $R_I$ is an initial or intermediate acceptable product capacity in BTU/hour, and $R_C$ is a corrected product capacity in BTU/hour.

The corrected product capacity obtained from this step may be used to select a suitable product or can be assigned to a further algorithm identifier "BTU 6".

The consumer is then asked to input a geographic location indicator which serves to identify the area where the desired product is to be used. Preferably, this indicator will be entered in the form of a postal zip code, although other methods can be used such as telephone area code and the like. In further accordance with the present invention, the server may advantageously be programmed to store a correlation of climate correction factors corresponding to zip codes or other geographic indicators and designed to suitably correct a product capacity for the specific climate of a geographic location of intended use. A portion of a typical correlation between zip code and climate factor is set forth below in Table 5.

TABLE 5

| ZIP CODE | CLIMATE |
|----------|---------|
| 12000 | 0.7 |
| 12999 | 0.7 |
| 13000 | 0.8 |
| 14999 | 0.8 |
| 15000 | 0.8 |
| 15999 | 0.8 |
| 16000 | 0.9 |
| 17999 | 0.9 |
| 18000 | 0.8 |
| 18999 | 0.8 |
| 19000 | 0.9 |
| 19999 | 0.9 |
| 20000 | 1 |
| 20099 | 1 |
| 20100 | 0.9 |
| 20999 | 0.9 |

In accordance with the method of the present invention, a further corrected acceptable product capacity is determined using the climate correction factor, for example as follows:

$R_C = R_I \cdot CF$, wherein $R_I$ is an initial or intermediate acceptable product capacity in BTU/hour, $R_C$ is a corrected acceptable product capacity in BTU/hour, and CF is a climate factor obtained as in Table 5.

The value of the corrected product capacity obtained in this step may be used to select a product or can be assigned to a further algorithm identifier "BTU 7".

The consumer is next asked to identify the number of people who normally occupy the room or intended use location. From this information, a further corrected acceptable product capacity is determined for example as follows:

$R_C = [(I-2) \cdot 600] + R_I$, wherein $R_I$ is an initial or intermediate acceptable product capacity in BTU/hour, $R_C$ is a corrected acceptable product capacity in BTU/hour, and I is the number of people entered by the consumer.

The corrected product capacity determined from this step may be used to select a product or can be assigned to a further algorithm identifier "BTU 8".

The consumer is preferably next asked to indicate whether the intended use location includes a kitchen, and a further corrected acceptable product capacity is determined based on this input, for example as follows:

If kitchen, then $R_C = R_I + 4,800$, and

Otherwise, $R_C = R_I + 300$, wherein $R_I$ is an initial or intermediate acceptable product capacity in BTU/hour, and $R_C$ is a corrected acceptable product capacity in BTU/hour.

The value of the corrected acceptable capacity determined in this step may be used to select a product or can be assigned to a further algorithm identifier "BTU 9".

The consumer may then preferably be asked to indicate whether the desired unit will be installed in a window or through a wall, and further whether the desired product must be capable of cooling and supplemental heating, or of cooling only. The information entered by the consumer at this step can be used to determine which table or portion of the relationship or table of acceptable BTU capacity to product identifier (Table 2, 3 and 4) to be used to identify a suitable product for the consumer.

For example, assuming use of all of the correction factors identified above, and use of Tables 2–4, if the consumer enters that the desired product is to be window mounted and need not have heating capacity, the suitable product would be selected from Table 2 using the value "BTU 9". If the consumer enters that the product is to be mounted through a wall and need not have heating capacity, a suitable product could be selected from Table 3 using the value "BTU 9". If the consumer indicates that the desired product must be capable of heating, a suitable product can be selected from Table 4 using the value "BTU 9", and if a window-mount is indicated as desired, the consumer could be advised to also purchase a window installation kit.

As shown in Tables 2–4, the product characteristic is preferably BTU rating for each product available. Once a corrected acceptable BTU capacity has been determined, a product having a BTU rating meeting the corrected acceptable BTU capacity is selected at the server from the appropriate table and identified to the consumer at the client machine. For example, if a consumer has indicated a wall mounted "cooling only" unit and information leading to a corrected acceptable BTU capacity of 4,100 BTU/hour, Table 3 would be used to select product identifier UCA051B corresponding to a wall mountable unit having a rating of 3,000–5,300 BTU/hour. Thus, the product characteristic is preferably a range representing capability of a particular product and the intended use product characteristic is a value, preferably corrected for various intended use factors, which can be compared or matched to the stored product characteristic ranges to identify a suitable product.

As set forth above, a series of correction steps or factors are identified for determining a corrected acceptable product capacity from an initial acceptable product capacity. A preferred embodiment of the present invention would include a series of correction factor determinations wherein the value BTU 1 identified above is assigned as the initial capacity for the next step, and so on, so as to obtain a final corrected acceptable product capacity which takes each factor into account. Through this method, a consumer is interactively guided to the selection of an ideal product for a specific intended use location, thereby avoiding problems inherent with use of air conditioning products having ratings too low or high for a desired intended use location.

The method of the present invention interacts with the consumer, asking that information be entered at the client machine by the consumer, and responding to entry with further information requests and/or identification of a suitable product from the server machine or network.

Thus, consumer guidance is provided in a readily available manner thereby greatly increasing accessibility of critical information for use in selecting an appropriate air conditioning product.

It should be readily appreciated that the foregoing specific steps provide a detailed description of a preferred method for carrying out the present invention. It should also be appreciated that a number of other correction factors, or a combination of some but not all of those factors discussed above could be assembled, all well within the scope of the present invention.

It should also be appreciated that this disclosure provides a method whereby a consumer can access a system by Internet for interactively guiding the selection of an appropriate product, whereby selection of an appropriate product based upon industry expertise is significantly more convenient for the consumer.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An interactive method for on-line selection of an air conditioning product, comprising the steps of:
   providing a database storing a plurality of air conditioning product identifiers and at least one corresponding product characteristic;
   interactively obtaining intended use information from a consumer for a desired air conditioning product and intended use location;
   equating said intended use information with an intended use product characteristic;
   identifying a suitable product having said at least one product characteristic meeting said intended use product characteristic; and
   identifying said suitable product to said consumer, wherein said corresponding product characteristic includes a BTU rating for each product, and wherein said step of interactively obtaining comprises:
   obtaining intended use location area from said consumer;
   transforming said intended use location area into an initial acceptable BTU capacity for said intended use location area;
   obtaining further intended use location information from said consumer;
   determining a correction factor from said further intended use location information; and
   applying said correction factor to said initial acceptable BTU capacity so as to obtain a corrected acceptable BTU capacity, and wherein said equating step comprises identifying said suitable product having said BUT rating meeting said corrected acceptable BTU capacity.

2. The method of claim 1, wherein said further intended use location information includes an indication from said consumer as to area of exterior facing glass at said intended use location, and wherein said corrected acceptable BTU capacity is determined as follows:
   $R_C=R_I+(C \cdot 60)$, wherein
   $R_I$ is said initial acceptable BTU capacity in BTU/hour,
   $R_C$ is said corrected acceptable BTU capacity in BTU/hour and
   C is said area of exterior facing glass in square feet.

3. The method of claim 2, wherein said further intended use location information includes an indication from said consumer as to whether said intended use location is above a cooled space, and wherein said corrected acceptable BTU capacity is determined as follows:
   if above a cooled space, $R_C=R_I \cdot 0.8$, and
   if not above a cooled space, $R_C=R_I \cdot 0.9$, wherein
   $R_I$ is said initial acceptable BTU capacity in BTU/hour, and
   $R_C$ is said corrected acceptable BTU capacity in BTU/hour.

4. The method of claim 1, wherein said further intended use location information includes an indication from said consumer as to whether said intended use location is in sun or shade, and wherein said corrected acceptable BTU capacity is determined as follows:
   if sun, $R_C=R_I \cdot 1.1$; and
   if shade, $R_C=R_I \cdot 0.95$; wherein
   $R_I$ is said initial acceptable BTU capacity in BTU/hour, and
   $R_C$ is said corrected acceptable BTU capacity in BTU/hour.

5. The method of claim 1, wherein said further intended use location information includes an indication from said consumer that a space above said intended use location is one of a roof, an attic, and an occupied room, and wherein said corrected acceptable BTU capacity is determined as follows:
   if roof, $R_C=R_I$,
   if attic, $R_C=R_I \cdot 0.85$, and
   if occupied room, $R_C=R_I \cdot 0.8$, wherein
   $R_I$ is said initial acceptable BTU capacity in BTU/hour, and
   $R_C$ is said corrected acceptable BTU capacity in BTU/hour.

6. The method of claim 1, wherein said further intended use location information includes an indication from said consumer as to whether said desired air conditioning product will be operated only at night, and wherein said corrected acceptable BTU capacity is determined as follows:
   if operated only at night, $R_C=R_I \cdot 0.65$, and otherwise, $R_C=R_I$, wherein
   $R_I$ is said initial acceptable BTU capacity in BTU/hour, and
   $R_C$ is said corrected acceptable BTU capacity in BTU/hour.

7. The method of claim 1, wherein said further intended use location information includes an indication from said consumer as to geographic location and wherein said step of determining said BTU correction factor includes determining a correction factor for said geographic location.

8. The method of claim 7, wherein said database stores a series of geographic location indicators and a series of correction factors corresponding to said geographic location indicators, and wherein said further intended use location information from said consumer includes a geographic location indicator.

9. The method of claim 8, further comprising the steps of determining an intended use location climate factor from said geographic location indicator, and determining a corrected acceptable product capacity as follows:
   $R_C=R_I \cdot CF$, wherein
   $R_I$ is said initial acceptable BTU capacity in BTU/hour, $R_C$ is said corrected acceptable BTU capacity in BTU/hour, and CF is said intended use location climate factor.

10. The method of claim 1, wherein said further intended use location information includes a number of occupants of said intended use location, and wherein said corrected acceptable BTU capacity is determined as follows:

$R_C = [(I-2) \times 60] + R_I$, wherein $R_I$ is said initial acceptable BTU capacity in BTU/hour, $R_C$ is said corrected acceptable BTU capacity in BTU/hour, and I is said number of occupants.

11. The method of claim 1, wherein said further intended use location information includes an indication from said consumer as to whether said intended use location includes a kitchen, and wherein said corrected acceptable BTU capacity is determined as follows:

if kitchen, $R_C = R_I + 4,800$; and if no kitchen, $R_C = R_I + 300$; wherein $R_I$ is said initial acceptable BTU capacity in BTU/hour, and $R_C$ is said corrected acceptable BTU capacity in BTU/hour.

12. The method of claim 1, wherein said database stores a series of product identifiers and corresponding ranges of product BTU ratings, and wherein said series is divided into a first portion applicable to air conditioning products which only cool and which mount through a window, a second portion applicable to air conditioning products which only cool and which mount through a wall, and a third portion applicable to air conditioning products which cool and heat, wherein said further intended use location information includes an indication from said consumer as to whether said desired air conditioning product is to be mounted in a wall or a window, and whether said desired air conditioning product must be able to cool and heat, and wherein said identifying step includes identifying said suitable product using said corrected acceptable BTU capacity and one of said first portion if said desired air conditioning product is to be mounted in a window and only cool, said second portion if said desired air conditioning product is to be mounted in a wall and only cool, and said third portion if said desired air conditioning product must cool and heat.

\* \* \* \* \*